United States Patent [19]

Fukushima

[11] Patent Number: 4,999,667

[45] Date of Patent: Mar. 12, 1991

[54] METHOD OF CONTROLLING DRYING IN PHOTOGRAPHIC PROCESSING APPARATUS

[75] Inventor: Osamu Fukushima, Kanagawa, Japan

[73] Assignee: Fuji Photo Film Co., Ltd., Kanagawa, Japan

[21] Appl. No.: 478,183

[22] Filed: Feb. 9, 1990

[30] Foreign Application Priority Data

Feb. 15, 1989 [JP] Japan .................................. 1-35560

[51] Int. Cl.[5] ....................... G03B 27/52; G03D 3/08; F26B 13/12

[52] U.S. Cl. ....................................... 355/28; 354/322; 34/52

[58] Field of Search ............... 354/298, 299, 319, 320, 354/321, 322; 355/27, 28; 34/44, 52, 53, 155

[56] References Cited

U.S. PATENT DOCUMENTS 4,260,234 4/1981 Burton ................................ 354/319

4,332,456 6/1982 Kaufmann ........................... 354/298

4,914,835 4/1990 Kose et al. ........................ 34/155 X

*Primary Examiner*—A. A. Mathews

*Attorney, Agent, or Firm*—Sughrue, Mion, Zinn, Macpeak & Seas

[57] ABSTRACT

A drying control method in a photograph processing apparatus for controlling the drying conditions through feed control of a photosensitive material in a photograph processing apparatus which is comprised of a printing section to print an image on the photosensitive material, a processor section to perform developing, fixing and water washing processes for the photosensitive material on which the image has been printed, and a drying section to dry the photosensitive material having been processed in said processor section. A time interval of feeding sheets of the photosensitive material into the drying section is changed dependent on an area of the photosensitive material to be processed. The proper drying process can thus be performed regardless of the processed area of the photosensitive material.

12 Claims, 5 Drawing Sheets

METHOD OF CONTROLLING DRYING IN PHOTOGRAPHIC PROCESSING APPARATUS

BACKGROUND OF THE INVENTION

1. Field of the Invention

The present invention relates to a drying control method in a photograph processing apparatus for controlling a time interval to feed photosensitive materials to a drying section of a photograph processing apparatus.

2. Description of the Prior Art

In photograph processing apparatus, a photosensitive material accommodated in a magazine is drawn into a printing section where an image of a negative film is focused onto the photosensitive material by a printing beam emitted from a light source. After the printing, the photosensitive material is cut off and fed into a processor section where it is immersed into a developing tank, a fixing tank and a water washing (cleaning) tank in this order for the developing process, the fixing process and the water washing process, respectively.

A drying section is disposed downstream from the processor section. The photosensitive material having been processed through the above steps passes through the drying section so as to be dried, and then discharged into a take-out tray.

In the conventional drying section, the feeding speed and the feeding interval of photosensitive materials are get constant at all times regardless of the dimensions of the photosensitive materials, such as a width, length and area (hereinafter referred to collectively as a size). Accordingly, the drying section is required to have a capability enough to dry photosensitive materials even when they have a size as large as processable by the printing section and the processor section, and are fed successively.

However, the above drying section set constant in the feeding speed and the feeding interval regardless of the size of photosensitive materials is not preferable in that the photosensitive materials having a small size may be overly dried in some cases. For this reason, it has been proposed to set up two or more feeding paths different in their feeding distances within the drying section, and to change the feeding path dependent on the size of photosensitive materials. In other words, the photosensitive materials having a relatively small size are guided to pass through the feeding path of a shorter feeding distance, while the photosensitive materials having a relatively large size are guided to pass through the feeding path of longer feeding distance. This allows a proper drying time in accordance with the respective size of photosensitive materials.

Because the drying section is enlarged with the above proposed structure, another technique has also been conceived which can change a drying capability by the use of a single feeding path. More specifically, hot air heated by a heater is sent by a fan into the drying section in order to dry a photosensitive material. The photosensitive material is also directly contacted with rollers arrayed along the feeding path, so that moisture is wiped off of the photosensitive material by the rollers which are warmed with hot air. The drying of the photosensitive material is promoted through thermal conduction. Accordingly, the drying of the photosensitive material is affected by the temperature and flow rate of the hot air. By controlling the temperature and the flow rate of the hot air which is dependent on the size of the photosensitive materials, the proper drying conditions can be provided for any size of photosensitive materials even with the feeding distance and the feeding interval set constant.

However, in the case of controlling the temperature and flow rate of the warm air, sensors for precisely detecting the temperature and humidity in the drying section as well as the outside air etc., are required, which increases the number of parts used. Further, since the temperature and the humidity in the drying section are changed dependent on the process area of a photosensitive material between a time point immediately after the drying process and a time point immediately before start-up of the next drying process, it may happen in some cases that the temperature control fluctuates and the proper drying conditions cannot be achieved. More specifically, while photosensitive materials are always conveyed at a constant feeding speed, the drying section has increased humidity and reduced temperature after the photosensitive material having a larger size has been dried. This gives rise to a problem that the temperature in the drying section must be quickly raised before starting the process of the next photosensitive material, and if such a rise in the temperature is delayed, the photosensitive material is not dried sufficiently. On the other hand, since neither the temperature nor the humidity in the drying section are so changed after the photosensitive material having a smaller size has been dried, the drying section has the temperature and the humidity beyond respective predetermined ranges even if the heater and the fan are once turned off. This may result in a fear of over drying.

SUMMARY OF THE INVENTION

In view of the conditions mentioned above, it is an object of the present invention to provide a drying control method in a photograph processing apparatus with which the proper drying process can be performed regardless of the size of photosensitive materials, by changing an interval time between successive feedings of the photosensitive materials dependent on the size thereof.

In one embodiment, the present invention is directed to a drying control method in a photograph processing apparatus for controlling the drying conditions through feed control of a photosensitive material in a photograph processing apparatus which comprises a printing section to print an image on the photosensitive material, a processor section to perform the developing, fixing and water washing processes for the photosensitive material on which the image has been printed, and a drying section to dry the photosensitive material which has been processed in the processor section, wherein a processed area of the photosensitive material in the printing section is detected, and sheets of the photosensitive material are sent into the drying section with a predetermined time interval when the processed area of the photosensitive material is not greater than a predetermined area, while the time interval is determined dependent on the processed area of the photosensitive material and sheets of the photosensitive material are sent into the drying section with the determined time interval, when the processed area of the photosensitive material exceeds the predetermined area.

In another embodiment of the present invention, an upper limit of the processed area of the photosensitive material in the print section is preset, the photosensitive material is cut off such that the processed area of the photosensitive material becomes not greater than the upper limit. The cut photosensitive material is sent into the drying section with the time interval dependent on the processed area of the cut photosensitive material.

In the first embodiment of the present invention, the area of the photosensitive material processed in the printing section is detected to determine whether or not the detected area is less than the predetermined area set in advance. When the processed area is not greater than the predetermined area, the sheets of the photosensitive material are sent into the drying section with the predetermined time interval to thereby properly process the sheets of the photosensitive material.

When the processed area of the photosensitive material in the printing section exceeds the predetermined area, the sheets of the photosensitive material could not positively be dried until discharge from the drying section, resulting in an insufficiently dried state, if they are sent into the drying section with the above predetermined time interval. In the present invention, therefore, when the processed area of the photosensitive material in the printing section exceeds the predetermined area, the time interval is determined dependent on the actually processed area of the photosensitive material. Each sheet of the photosensitive material is brought into a stand-by state upstream of the drying section for the determined time interval, followed by being sent into the drying section. During the interval time, the temperature is increased and the humidity is reduced in the drying section. Thus, the drying section is restored to such a state as to be able to provide a higher drying capability even with the same feeding time within the drying section. Accordingly, the sheets of the photographic material having the processed area in the printing section greater than the predetermined area, can also be dried properly without any fear of insufficient drying, even if they are fed at a usual feeding speed.

With the present invention, therefore, it is possible to properly dry photosensitive materials ranging from a small size to a large size, and hence make the entire apparatus more compact. This may be done without the need of increasing the dimension of the drying section to be fit for the photosensitive material of maximum size, or wihtout modifying the control sequence for temperature and humidity in the drying section, as well as the feeding speed.

In the second embodiment of the present invention, the upper limit of the processed area of the photosensitive material is determined. This permits the present invention to be applied to such an apparatus for printing service size sheets of the photosensitive material frequency used in the simultaneous printing process, for example, without changing the capability of a drying section of this apparatus. In general, this type of apparatus includes a reservoir section, and plural images are printed successively on the photosensitive material. Therefore, the object of the present invention can be achieved by bringing the photosensitive material into a stand-by state in the reservoir section dependent on the processed area of the photosensitive material.

DETAILED DESCRIPTION OF PREFERRED EMBODIMENTS

Figure 1:
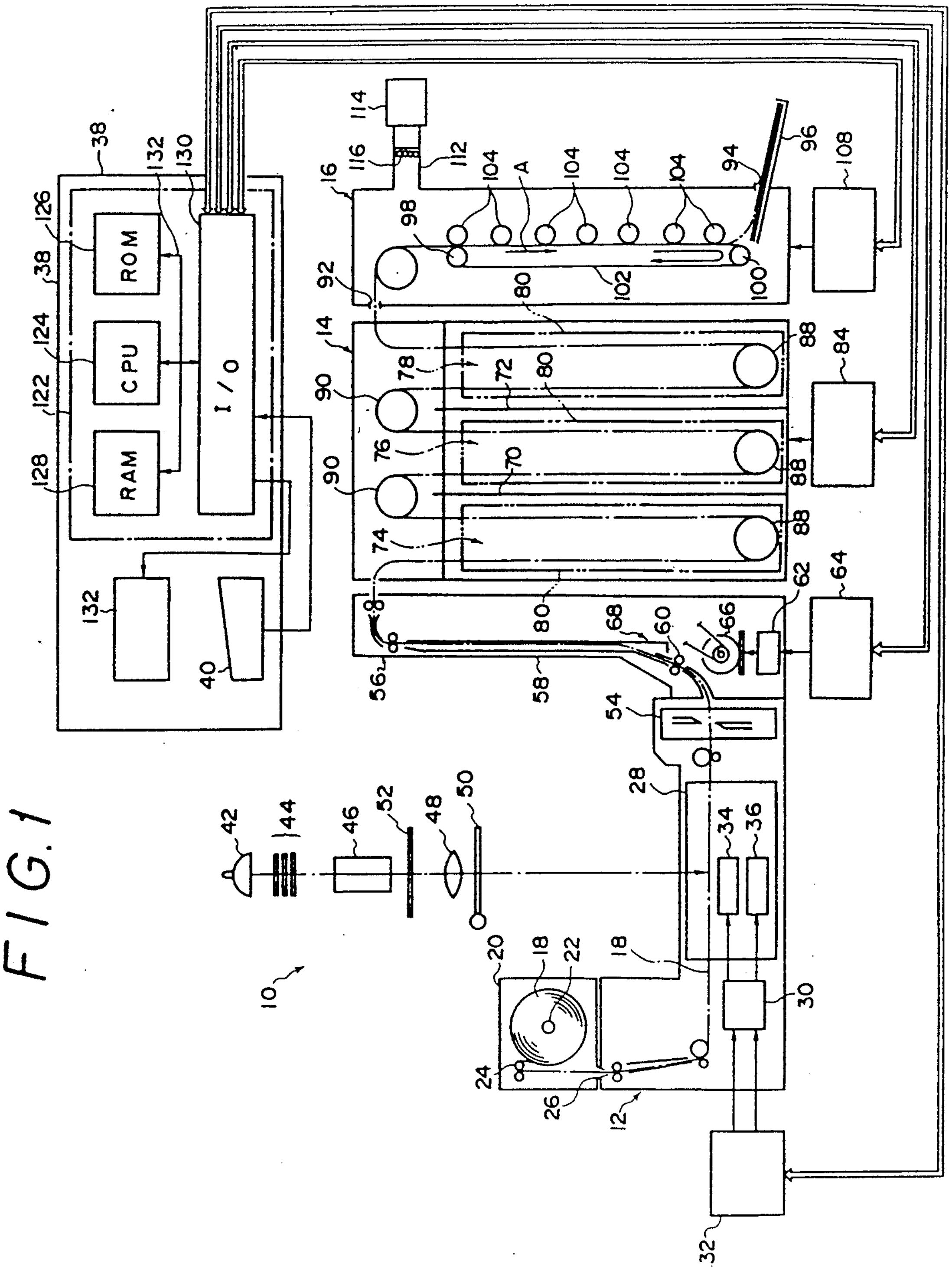
FIG. 1 is a schematic view showing the configuration of a photograph processing apparatus to which the present invention can be applied.

FIG. 1 shows a photograph processing apparatus 10 to which a drying control method according to the present invention can be applied. The photograph processing apparatus 10 is comprised of a printing section 12, a processor section 14, and a drying section 16.

A magazine 20 is placed at the top of the printing section 12 and accommodates photographic paper 18 made of a photosensitive material. Within the magazine 20, the photographic paper 18 is rolled around a wind-up shaft 22 in layers. The leading end of the photographic paper 18 at the uppermost layer is wound over a take-up roller 24, and then drawn through an opening 26 formed in the bottom of the magazine 20 for being fed into the printing section 12.

At an intermediate portion of the photographic paper feeding path within the printing section 12, a frame 28 is provided to define a printed region (i.e., a continuous processed area per one printing) of the photographic paper 18 by a lengthwise mask head extending in the direction of length of the photographic paper and a widthwise mask head extending in the direction of width thereof (Neither mask head is shown). The lengthwise mask head and the widthwise mask head can be moved upon the energization of stepping motors 34, 36 connected to a printing control section 32 via a driver 30, respectively. The stepping motors 34, 36 are driven based on the number of pulses produced dependent on the image printing size, thereby determining positions of the respective mask heads. The image printing size is selected by key operation on a key board 40 of a main control section 38 connected to the printing control section 32.

A light source 42 is disposed above the frame 28 and emits a printing beam for exposing the printing paper 18. Along the optical axis between the light source 42 and the frame 28, there are disposed a CC filter 44, a light diffusing tube 46, a lens 48 and a black shutter 50 in order. Also, a negative film 52 is positioned between the light diffusing tube 46 and the lens 48. With such arrangement, a transmitted image of the negative film 52 is focused on the printing paper 18 when the black shutter 50 is opened.

A cutter unit 54 is disposed downstream of the frame 28. The cutter unit 54 serves to cut off the photographic paper 18 on the basis of image-by-image dependent on the size of the photographic paper 18 that has been printed. The cutter unit 54 is controlled by the printing control section 32, and the cutting position is determined based on the image printed size selected by key operation on the key board 40.

A feed-out unit 56 is disposed downstream from the cutter unit 54. The feed-out unit 56 has an elongate casing 58 in which a plurality of rollers 60 are arranged vertically as viewed in FIG. 1. A sheet of the photographic paper 18 cut off by the cutter unit 54 is sent into the interior of the feed-out unit 56 from its lower side, and then conveyed up to the upper side therethrough while being guided by the rollers 60. The rollers 60 are driven by a driving force of a motor 66 connected to a feed-out unit control section 64 via a driver 62 in order to convey the sheets of the photographic paper 18 at a preset feeding speed. Note that the feed-out unit 56 includes a stock portion 68 which can stock therein plural sheets of the photographic paper 18. Thus, even when two or more sheets of the photographic paper 18 overlap due to a difference between the timing at which the preceding sheet of the photographic paper 18 is sent out to the processor section 14 disposed on the downstream side and the timing at which the succeeding sheet of the photographic paper 18 is sent in from the printing section 12, the feed-out unit 56 can absorb such a time lag.

The processor section 14 is divided by partitions 70, 72 into a developing tank 74, a fixing tank 76 and a water washing tank 78 in which a developing solution, a fixing solution and water are filled, respectively. In each of these tanks, there is disposed a photographic paper feed rack 80 which comprises a plurality of rollers and a guide plate (both not shown). The rollers are driven by a driving force of a motor (not shown) connected to a processor control section 84. The sheet of the photographic paper 18 is conveyed downward from the liquid surface toward the tank bottom while being guided by the rollers and the guide plate of each feed rack 80, and reversed in the feeding direction by a reverse rollers 88 at the tank bottom for being conveyed upward to emerge from the liquid surface again. Reversion rollers 90 are disposed between the developing tank 74 and the fixing tank 76 and between the fixing tank 76 and the water washing tank 78 for guiding the sheet of photographic paper 18 from one tank to an adjacent tank. It is to be noted that the sheet of photographic paper 18 is conveyed at a preset feeding speed in conformity with periods of time to be immersed in the developing solution, the fixing solution and the water, respectively.

The drying section 16 is disposed downstream from the processor section 14. The drying section 16 has at its upper portion an inlet port 92 for receiving the sheet of photographic paper 18 having been completely processed in the processor section 14, and at its lower portion an outlet port 94. A take-out tray 96 is attached in the outlet port 94 so that the sheets of the photographic paper 18, successively discharged from the drying section 16, can be stocked on the take-out tray 96 in the form of a stack. Within the drying section 16, a feed belt 102 is entrained between a roller 98 disposed at the upper side and a roller 100 disposed at the lower side, with a plurality of squeeze rollers 104 disposed in opposite relation to the surface of the feed belt 102. The upper roller 98 is driven by the energization of a motor (not shown) connected to a drying control section 108, for moving the feed belt 102 in the direction of arrow A in FIG. 1. The sheet of the photographic paper 18 sent into the drying section 16 through the inlet port 92 is thereby held between the feed belt 102 and the squeeze rollers 104 to be conveyed downward as viewed on FIG. 1.

The drying section 16 is provided with a duct 112 to which a fan 114 and a heater 116 are attached. The fan 114 and the heater 116 are connected to the drying control section 108 so that dry air at a predetermined temperature can be sent into the drying section 16. The temperature in the drying section is controlled to remain nearly constant. As one control method, a temperature sensor may be attached directly to the drying section 16 for feedback control. Alternative control may be performed through calculations based on capabilities of the fan 114 and the heater 116, heat loss of the duct 112, and other factors.

The main control section 38 for controlling the printing control section 32, the feed-out unit control section 64, the processor control section 84 and the drying control section 108 includes a microcomputer 122. The microcomputer 122 comprises a CPU 124, a ROM 126, a RAM 128, an input/output port 130, and a set of buses 132 such as data buses and control buses interconnecting these components.

Connected to the input/output port 130 are the printing control section 32, the feed-out unit control section 64, the processor control section 84 and the drying control section 108, whereby signals are supplied from the microcomputer 122 to the respective control sections, or vice versa, through the input/output port 130. The key board 40 and a display 132 are also connected to the input/output port 130.

The main control section 38 calculates an area $S_C$ of the printed photographic paper 18 when the image printing size is input through the key board 40 to determine positions of the lengthwise mask and the widthwise mask in the printing section 12.

The RAM 128 stores a predetermined area $S_M$ which can properly be dried in the drying section 16 at a usual feeding speed. The calculated area $S_C$ is compared with the stored area $S_M$. If $S_C > S_M$ holds, a stand-by time (interval) of sheets of the photographic paper 18 in the feed-out unit 56 is set from a map shown in FIG. 3 dependent on the difference therebetween. The interval time of sheets of the photographic paper 18 to be fed to the drying section 16 can thereby be made longer so that the next sheet of the photographic paper 18 is fed to the drying section 16 after raising the temperature and lowering the humidity in order to enhance a drying capability.

Operation of this embodiment will be described below.

First, key operation is made on the key board 40 to set the image printed size for starting the printing process. The photographic paper 18 is drawn from the magazine 20 so as to reach the frame 28. Upon the photographic paper 18 reaching a predetermined position of the frame 28, the lengthwise mask and the widthwise mask are moved by driving forces of the stepping motors 34, 36, respectively, to mask the peripheral edges of the photographic paper 18 dependent on the printed area of the photographic paper 18. Then, when the black shutter 50 is opened for a predetermined time, the printing beam emitted from the light source transmits an image of the negative film 52 so that the image is focused on the photographic paper 18.

After completion of the printing process, the photographic paper 18 is fed toward the feed-out unit 56 and cut off by the cutter unit 54 at the rear end of the printed area. The feed-out unit 56 conveys the cut sheet of the photographic paper 18 upward as viewed on FIG. 1 for sending it into the inlet port 92 of the processor section 14. In the processor section 14, the sheet of the photographic paper 18 is immersed into the developing tank 74, the fixing tank 76 and the water washing tank 78 in this order, followed by entering the drying section 16. The drying section 16 is controlled to a predetermined temperature by the fan 114 and the heater 116, and the sheet of the photographic paper 18 is dried while moving through the drying section 16. At this time, moisture deposited on the sheet of the photographic paper 18 is wiped off by the squeeze rollers 104. The dried sheet of the photographic paper 18 is led into the take-out tray 96 installed at the lower side of the drying section. The squeeze rollers 104 become wet just after wiping off moisture on the sheet of the photographic paper 18, but they can be dried thoroughly during the predetermined time interval until the next sheet of the photographic paper 18 is fed to the drying section. As a result, the proper drying capability can be restored and maintained.

Figure 2:
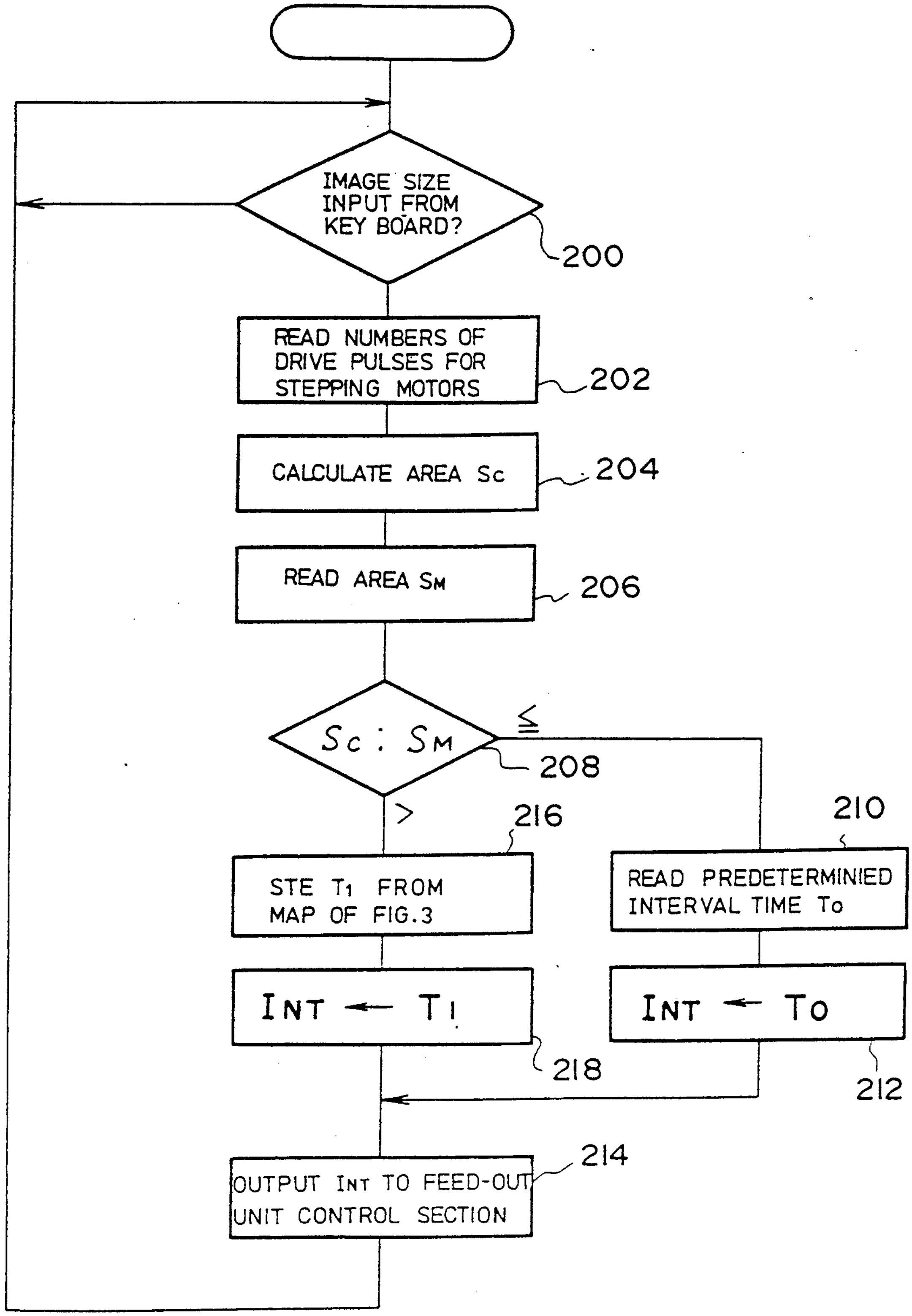
FIG. 2 is a control flowchart.

In the photograph processing apparatus 10 of this embodiment, the timing to send the sheet of the photographic paper 18 into the drying section 16 can be changed dependent on the printed area of the photographic paper 18 for providing the optimum drying conditions at all times. The drying control sequence through feed control will now be described with reference to a flowchart in FIG. 2.

First, step 200 determines whether or not the image printed size is input from the key board 40. If the result is yes, the control flow proceeds to step 202 where the numbers of pulses for the stepping motors 34, 36 are read to move the lengthwise mask and the widthwise mask. Then, step 204 calculates the sheet area $S_C$ of the photographic paper 18 based on the numbers of pulses. This can easily be made by storing respective areas dependent on a set of reference numbers of pulses in advance.

Next step 206 reads the predetermined area $S_M$ which has been stored in the RAM 128 of the microcomputer 122 in advance. Both the areas ($C_C$:$S_M$) are compared with each other in step 208. If $S_C \leqq S_M$ holds as the result of the comparison, this is judged that the sheet of the photographic paper 18 can be processed at a usual drying temperature in the drying section 16. Thus, the control flow proceeds to step 210 to read $T_0$ which is a relatively short interval time preset. The read interval time $T_0$ is substituted for an Interval $I_{NT}$ (variable) in step 212, followed by proceeding to step 214.

Meanwhile, if $S_C > S_M$ holds as the result of the comparison in step 208, this is judged that the sheet of the photographic paper may insufficiently be dried with a usual drying capability. Thus, in order to provide a higher drying capability than usual one by increasing the temperature and reducing the humidity in the drying section 16, the interval time of sheets of the photographic paper to be sent into the drying section 16 is set based the calculated $S_C$ using the map in FIG. 3. In other words, the control flow proceeds from step 208 to step 216 for reading an interval time $T_1$ dependent on the calculated area $S_C$. Then, the interval time $T_1$ is substituted for the Interval $I_{NT}$ in step 218, followed by proceeding to step 214.

For example, in the case of processing a sheet of photographic paper not greater than an $8 \times 12$ inch size, the interval time is set to a value corresponding to the interval of 30 mm (which corresponds to the predetermined interval time $T_0$). The interval time $T_1$ is set to a value corresponding to the interval of 100 mm in the case of $10 \times 14$ inch size, and to a value corresponding to the interval of 200 mm in the case of $12 \times 18$ inch size, thereby ensuring the complete drying.

In step 214, the Interval $I_{NT}$ obtained in step 212 or step 218 is output to the feedout unit control section 64. Afterward, the control flow returns to step 200 to wait for input of the next image printed size.

Dependent on the Interval $I_{NT}$ supplied from the main control section 38, the feed-out unit control section 64 controls the motor 66 such that the succeeding sheet of photographic paper 18 is fed into the processor section 14 upon the elapse of the Interval $I_{NT}$ after the preceding sheet of photographic paper 18 has been fed. Since the stock portion 68 is provided in the feed-out unit 56, the sheets of photographic paper 18 will not cause double feeding or stop midway due to sticking into the overlapped state, i.e., a so-called jam will not occur, even when the succeeding sheet of photographic paper 18 is sent into the feed-out unit 56 from the printing section 12 before the preceding sheet of the photographic paper 18 has been sent into the processor section 14.

With this embodiment, as described above, photographic paper ranging from a small size to a large size can be dried properly without the need of a large-sized structure which results from providing a plurality of kinds of feeding paths different in their distances in the drying section 16, or from setting up a drying capability of the drying section 16 to be fit to dry the photographic paper of maximum size. It is hence possible to reduce the number of parts used and to make the entire apparatus more compact. In addition, since there is neither the need of sever temperature control nor the need of changing any other settings in the control system, such as modifying a feeding speed, the respective units (i.e., the printing section 12, the feed-out unit 56, the processor section 14 and the drying section 16) can be assembled independently of one another, whereby assembling operability is improved.

Although the time interval of feeding the sheets of photographic paper is changed in the feed-out unit 56 in this embodiment, a separate stock section may be provided between the processor section 14 and the drying section 16. In the case of this embodiment where the processor section 14 and the drying section 16 are adjacent to each other, however, it is optimum to take the interval in the feed-out unit 56 so that the respective processing times in the processor section 14 may not be affected.

Further, although the sheet area of the photographic paper is calculated from the image printed size based on the number of pulses for driving the pulse motors 34, 36 in this embodiment, the size of the photographic paper 18 may automatically be detected by mounting a line sensor or the like upstream from the cutter unit 54 in the vicinity thereof. In this case, it is possible to detect the width of the photographic paper from outputs of respective sensors arranged in the direction of width thereof, and the length of the cut sheet of photographic paper from the product of a period of time from the beginning to the end of detection and the feeding speed.

Figure 3:
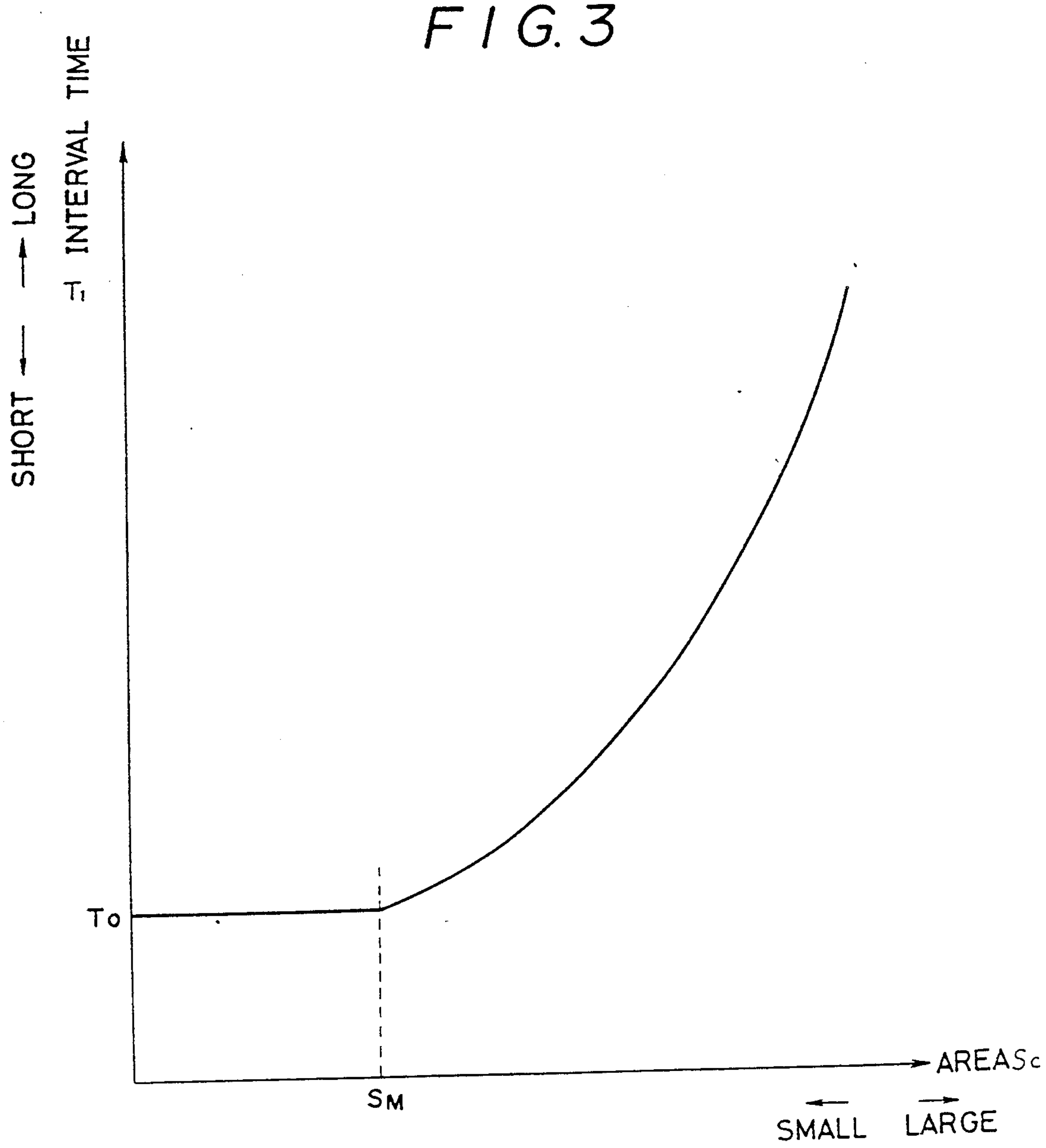
FIG. 3 is a map showing the relationship between a culculated area of photographic paper and an interval time.

Moreover, although the interval time is obtained from the map shown in FIG. 3 steplesly based on the calculated area in this embodiment, it may be set stepwisely by determining several ranges of paper sheet areas in advance.

Figure 4:
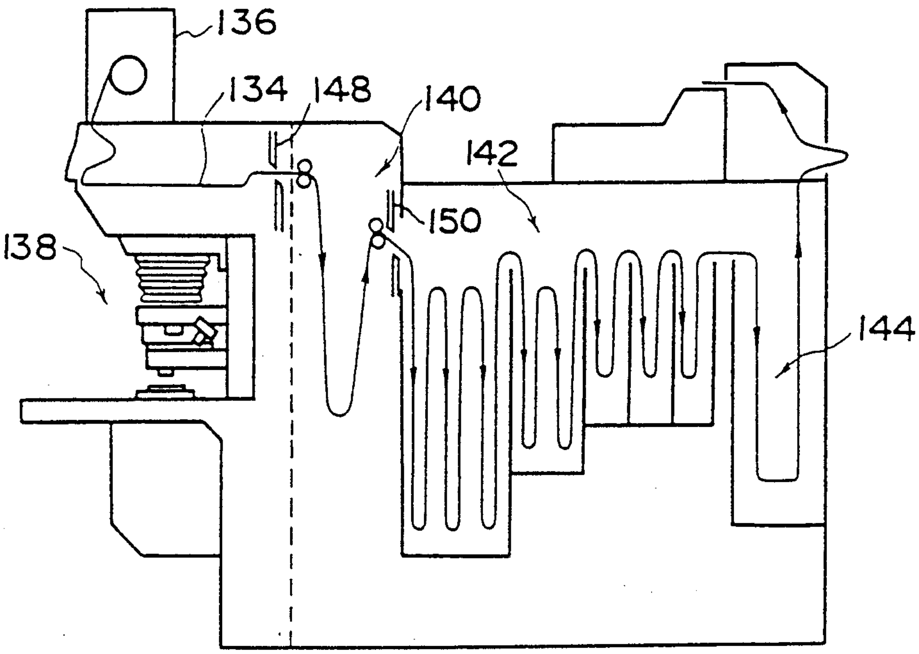
FIG. 4 is a schematic view of a photograph processing apparatus for use in processing photographic paper of a predetermined width.

In addition, although the interval time is controlled for the sheets of photogarphic paper 18 different in both length and width in this embodiment, the present invention is also applicable to a photographic processing apparatus of the type shown in FIG. 4. More specifically, photographic paper 134 having a certain width (e.g., 6 inches) is accommodated in a magazine 136 in the form of a roll. The photographic paper 134 is drawn from the magazine 136 and fed into a printing section 138 where it is printed successively a plurality of times, and then stocked in a reservoir section 140 installed downstream from the printing section 139 until the printed photographic paper reaches a predetermined length. In the case where the printing of the photographic paper is completed before reaching the predetermined length, the photographic paper is cut by a cutter 148 located immediately before the reservoir section 140. At a time when the photographic paper reaches the predetermined length that allows it to be continuously sent into a processor section 142, the photographic paper is cut by a cutter 150 located immediately after the reservoir section 140 and fed into the processor section 142 and a drying section 144. In such an apparatus, the interval time is set dependent on the length of the photographic paper 134 stocked in the reservoir section 140.

For example, the interval time is set to one minute for a stock length of 3 m in the reservoir section 140 two minutes for a stock length of 6 m, and four minutes for a stock length of 12 m, respectively, for ensuring positive drying process.

Figure 5:
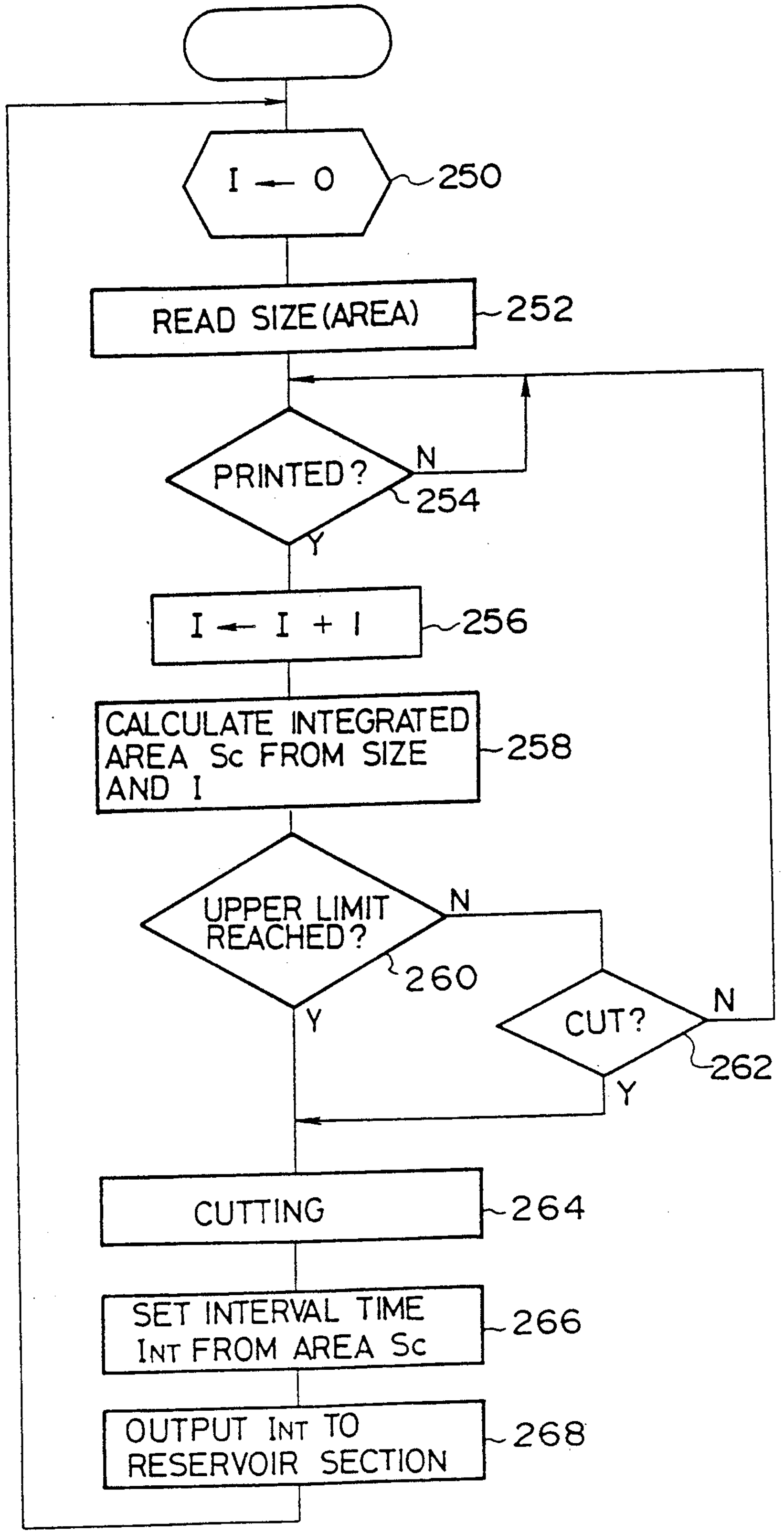
FIG. 5 is a control flowchart used in the photograph processing apparatus shown in FIG. 4.

The sequence of setting the interval time in the photograph processing apparatus shown in FIG. 4 will be described below with reference to a flowchart of FIG. 5.

First, a variable I is cleared (to 0) in step 250. Then, step 252 reads the size of the photographic paper 134. In next step 254, it is determined whether or not the photographic paper corresponding to one image has been printed. If the result is yes, the control flow proceeds to step 256 to increment the variable I.

Next step 258 calculates the integrated printed area $S_C$ from the size of the photographic paper 134 and the number of printing times (i.e., the value of the variable I). Step 260 then determines whether or not the integrated area $S_C$ has reached an upper limit set in advance. If the result is no in step 260, the control flow proceeds to step 262 to determined whether or not the photographic paper 134 is cut at this point although the reservoir section 140 still has further space for stocking the photographic paper 134. If not cut, the control flow returns to step 254. If cut, it proceeds to step 264 where the photographic paper is cut by the cutter 148.

If the result is yes in step 260, i.e., the integrated area $S_C$ reaches the upper limit, it is judged that the extent of the photographic paper stocked in the reservoir section 140 has become too large to receive the proper continuous drying process. Thus, the control flow proceeds to step 264 where the photographic paper 134 is forcibly cut by the cutter 150 immediately before the processor section 142.

In next step 266, a predetermined interval time $I_{NT}$ is set based on the integrated area $S_C$ of the photographic paper 134 stocked in the reservoir section 140. The control flow then proceeds to step 268 where the interval time $I_{NT}$ is output to a control section which controls the feeding system for the reservoir section 140. In response to the interval time $I_{NT}$ supplied, the reservoir section 140 controls the timing to feed the photographic paper 134 such that the photographic paper can always be subjected to the optimum drying process in the drying section 144.

With the drying control method in the photographic processing apparatus according to the present invention, as described above, the proper drying process can be performed regardless of the size of photosensitive materials, by changing the interval time for feeding sheets of the photosensitive materials into a drying section dependent on the size thereof.

What is claimed is:

1. A drying control method in a photograph processing apparatus for controlling the drying conditions through feed control of a photosensitive material in a photograph processing apparatus which is comprised of a printing section to print an image on the photosensitive material, a processor section to perform the developing, fixing and water washing processing for the photosensitive material on which the image has been printed, and a drying section to dry the photosensitive material having been processed in said processor section, comprising:

a first step of detecting a processed area of the photosensitive material in said printing section; and a second step of sending sheets of the photosensitive material into said drying section with a predetermined time interval when the processed area of the photosensitive material detected by said first step is not greater than a predetermined area, and sending sheets of the photosensitive material into said drying section with a time interval dependent on the processed area of the photosensitive material, when the processed area of the photosensitive material detected by said first step exceeds the predetermined area.

2. A drying control method in a photograph processing apparatus according to claim 1, further comprising a third step of determining whether or not the processed area of the photosensitive material detected by said first step is less than a predetermined area, between said first step and said second step.

3. A drying control method in a photograph processing apparatus according to claim 2, wherein said third step is performed by comparing a predetermined area stored in advance with the processed area of the photosensitive material detected by said first step.

4. A drying control method in a photograph processing apparatus according to claim 1, wherein said second step includes a fourth step of determining a time interval dependent on the processed area of the photosensitive material, when the processed area of the photosensitive material detected by said first step exceeds the predetermined area.

5. A drying control method in a photograph processing apparatus according to claim 4, wherein said fourth step determines the time interval based on a map showing the relationship between the time interval and the processed area of the photosensitive material.

6. A drying control method in a photograph processing apparatus according to claim 4, wherein said fourth step determines the time interval stepwisely.

7. A drying control method in a photograph processing apparatus according to claim 1, wherein said first step is performed by measuring a length and a width of the photosensitive material.

8. A drying control method in a photograph processing apparatus for controlling the drying conditions through feed control of a photosensitive material in a photograph processing apparatus which is comprised of a printing section to print an image on the photosensitive material, a processor section to perform developing, fixing and water washing processes for the photosensitive material on which the image has been printed, and a drying section to dry the photosensitive material having been processed in said processor section, comprising:

a first step of setting an upper limit of a processed area of the photosensitive material in said printing section;

a second step of cutting the photosensitive material such that the processed area of the photosensitive material becomes not greater than the upper limit; and a third step of sending the cut photosensitive material into said drying section with a time interval dependent on the processed area of the cut photosensitive material.

9. A drying control method in a photograph processing apparatus according to claim 8, wherein said third step determines the time interval based on a map showing the relationship between the time interval and the processed area of the photosensitive material.

10. A drying control method in a photograph processing apparatus according to claim 9, wherein said third step determines the time interval stepwisely.

11. A drying control method in a photograph processing apparatus according to claim 8, further comprising a fourth step of calculating the processed area of the photosensitive material in said printing section, prior to said second step.

12. A drying control method in a photograph processing apparatus according to claim 11, further comprising a fifth step of comparing the calculated processed area of the photosensitive material with said upper limit, between said fourth step and said second step.

* * * * *